United States Patent
Tzur et al.

(10) Patent No.: US 8,711,234 B2
(45) Date of Patent: *Apr. 29, 2014

(54) IMAGE ENHANCEMENT BASED ON MULTIPLE FRAMES AND MOTION ESTIMATION

(71) Applicant: CSR Technology Inc., Sunnyvale, CA (US)

(72) Inventors: Meir Tzur, Haifa (IL); Artemy Baxansky, Nesher (IL)

(73) Assignee: CSR Technology Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,216

(22) Filed: May 28, 2013

(65) Prior Publication Data

US 2013/0258174 A1    Oct. 3, 2013

Related U.S. Application Data

(63) Continuation of application No. 12/397,727, filed on Mar. 4, 2009, now Pat. No. 8,482,620.

(60) Provisional application No. 61/035,424, filed on Mar. 11, 2008.

(51) Int. Cl.
*H04N 5/228* (2006.01)
*H04N 5/235* (2006.01)

(52) U.S. Cl.
USPC .............. 348/208.4; 348/208.99; 348/206.1; 348/208.16; 348/362

(58) Field of Classification Search
USPC ............... 348/207.99, 208.99, 208.1, 208.2, 348/208.3, 208.4, 208.5, 208.6, 208.7, 348/208.8, 208.11, 208.12, 208.13, 208.14, 348/208.15, 208.16, 220.1, 221.1, 222.1, 348/229.1, 230.1, 241, 248, 362, 363, 364
See application file for complete search history.

(56) References Cited

U.S. PATENT DOCUMENTS 3,626,827 A   12/1971   Yanagi et al.
3,690,234 A    9/1972   Costianes (Continued)

FOREIGN PATENT DOCUMENTS

JP   H04-038778   2/1992
JP   05-34757     2/1993

(Continued)

OTHER PUBLICATIONS

Official Communication for Japanese Patent Application No. 2008-538133 dated Jun. 11, 2012.

(Continued)

*Primary Examiner* — Twyler Haskins
*Assistant Examiner* — Peter Chon
(74) *Attorney, Agent, or Firm* — Frommer Lawrence & Haug LLP; John W. Branch

(57) ABSTRACT

A system and method for capturing images is provided. In the system and method, preview images are acquired and global local and local motion are estimated based on at least a portion of the preview images. If the local motion is less than or equal to the global motion, a final image is captured based at least on an exposure time based on the global motion. If the local motion is greater than the global motion, a first image is captured based on at least a first exposure time and at least a second image is captured based on at least one second exposure time less than the first exposure time. After capturing the first and second images, global motion regions are separated from local motion regions in the first and second images, and the final image is reconstructed at least based on the local motion regions.

20 Claims, 7 Drawing Sheets

(56) References Cited

U.S. PATENT DOCUMENTS

| | | | |
|---|---|---|---|
| 3,828,122 | A | 8/1974 | McPhee et al. |
| 4,218,119 | A | 8/1980 | Schickedanz |
| 5,043,816 | A | 8/1991 | Nakano et al. |
| 5,220,375 | A | 6/1993 | Ishida et al. |
| 5,223,935 | A | 6/1993 | Tsuji et al. |
| 5,255,044 | A | 10/1993 | Ishiguro |
| 5,490,225 | A | 2/1996 | Kumagai |
| 5,692,223 | A | 11/1997 | Ichikawa et al. |
| 5,742,340 | A | 4/1998 | Alves |
| 5,905,848 | A | 5/1999 | Yano et al. |
| 5,999,746 | A | 12/1999 | Kitagawa |
| 6,072,525 | A | 6/2000 | Kaneda |
| 6,173,121 | B1 | 1/2001 | Tomita et al. |
| 6,301,440 | B1 | 10/2001 | Bolle et al. |
| 6,532,264 | B1 | 3/2003 | Kahn |
| 6,859,618 | B1 | 2/2005 | Yip |
| 6,891,570 | B2 | 5/2005 | Tantalo et al. |
| 6,900,846 | B2 | 5/2005 | Lee et al. |
| 6,903,764 | B2 | 6/2005 | Kusaka |
| 6,914,624 | B1 | 7/2005 | Esquibel et al. |
| 6,961,518 | B2 | 11/2005 | Suzuki |
| 7,030,911 | B1 | 4/2006 | Kubo |
| 7,546,026 | B2 * | 6/2009 | Pertsel et al. ............... 396/52 |
| 7,692,715 | B2 * | 4/2010 | Kitajima .................. 348/362 |
| 7,697,836 | B2 | 4/2010 | Pozniansky et al. |
| 7,796,872 | B2 * | 9/2010 | Sachs et al. ................ 396/55 |
| 8,013,909 | B2 | 9/2011 | Nikkanen et al. |
| 8,482,620 | B2 * | 7/2013 | Tzur et al. .............. 348/208.4 |
| 2002/0039137 | A1 | 4/2002 | Harper et al. |
| 2003/0063322 | A1 | 4/2003 | Itoh et al. |
| 2003/0095189 | A1 | 5/2003 | Liu et al. |
| 2003/0174772 | A1 | 9/2003 | Voronov et al. |
| 2003/0180037 | A1 | 9/2003 | Sommers |
| 2004/0130628 | A1 | 7/2004 | Stavely |
| 2004/0160525 | A1 | 8/2004 | Kingetsu et al. |
| 2004/0169768 | A1 | 9/2004 | Lee et al. |
| 2004/0218079 | A1 | 11/2004 | Stavely et al. |
| 2004/0239771 | A1 | 12/2004 | Habe |
| 2004/0252230 | A1 * | 12/2004 | Winder .................. 348/402.1 |
| 2004/0252765 | A1 | 12/2004 | Hosoda |
| 2005/0041121 | A1 | 2/2005 | Steinberg et al. |
| 2005/0128343 | A1 | 6/2005 | Murata et al. |
| 2006/0008171 | A1 | 1/2006 | Petschnigg et al. |
| 2006/0017814 | A1 | 1/2006 | Pinto et al. |
| 2006/0017837 | A1 | 1/2006 | Sorek et al. |
| 2006/0029377 | A1 | 2/2006 | Stavely et al. |
| 2006/0029382 | A1 | 2/2006 | Uchida |
| 2006/0039690 | A1 | 2/2006 | Steinberg et al. |
| 2006/0056835 | A1 | 3/2006 | Poon et al. |
| 2006/0115297 | A1 | 6/2006 | Nakamaru |
| 2006/0170816 | A1 | 8/2006 | Silverstein et al. |
| 2006/0187308 | A1 | 8/2006 | Lim et al. |
| 2007/0009245 | A1 | 1/2007 | Ito |
| 2007/0071424 | A1 | 3/2007 | Poon et al. |
| 2007/0092244 | A1 | 4/2007 | Pertsel et al. |
| 2008/0043112 | A1 | 2/2008 | Nikkanen et al. |
| 2008/0044170 | A1 | 2/2008 | Yap et al. |
| 2009/0040364 | A1 | 2/2009 | Rubner |
| 2009/0102935 | A1 | 4/2009 | Hung et al. |
| 2009/0154821 | A1 * | 6/2009 | Sorek et al. .................. 382/250 |
| 2009/0231449 | A1 | 9/2009 | Tzur et al. |
| 2009/0256921 | A1 | 10/2009 | Pertsel et al. |
| 2010/0150540 | A1 | 6/2010 | Pozniansky et al. |
| 2010/0201826 | A1 | 8/2010 | Steinberg et al. |
| 2012/0148224 | A1 | 6/2012 | Pozniansky et al. |

FOREIGN PATENT DOCUMENTS

| | | |
|---|---|---|
| JP | H06-176514 | 6/1994 |
| JP | 06-308588 | 11/1994 |
| JP | H07-307889 | 11/1995 |
| JP | H08-256289 | 10/1996 |
| JP | 08-320511 | 12/1996 |
| JP | 08-327917 | 12/1996 |
| JP | 10-174027 | 6/1998 |
| JP | H10-336511 | 12/1998 |
| JP | 11-088810 | 3/1999 |
| JP | 11-326980 A | 11/1999 |
| JP | H11-346326 | 12/1999 |
| JP | 2002-359756 | 12/2002 |
| JP | 2004-215283 | 7/2004 |
| JP | 2005-109824 | 4/2005 |

OTHER PUBLICATIONS

Official Communication for U.S. Appl. No. 13/369,173 mailed May 23, 2012.
Official Communication for U.S. Appl. No. 13/369,173 mailed Oct. 2, 2012.
Official Communication for U.S. Appl. No. 13/369,173 mailed Jan. 22, 2013.
Official Communication in Japanese Patent Application No. 2008-538133 transmitted Jun. 11, 2012.
Official Communication for U.S. Appl. No. 12/397,727 mailed Apr. 1, 2013.
Official Communication for U.S. Appl. No. 12/397,727 mailed Jun. 15, 2012.
Official Communication for U.S. Appl. No. 12/397,727 mailed Apr. 4, 2012.
Official Communication for U.S. Appl. No. 12/397,727 mailed Dec. 30, 2011.
Official Communication for U.S. Appl. No. 12/397,727 mailed Jun. 21, 2011.
Pertsel et al., "Camera Exposure Optimization Techniques That Take Camera and Scene Motion Into Account," U.S. Appl. No. 11/258,975, filed Oct. 25, 2005, 30 pages.
"Xenon flash lamp," from Wikipedia, http://en.wikipedia.org/wiki/Xenon_flash_lamp, downloaded on Jul. 5, 2006, 3 pages.
International Search Report and Written Opinion for International Patent Application No. PCT/US2007/082128, mailed May 15, 2008.
International Preliminary Report on Patentability for International Patent Application No. PCT/US2007/082128, mailed May 7, 2009.
International Search Report and Written Opinion for International Patent Application No. PCT/US2006/060056, mailed Sep. 6, 2007.
International Preliminary Report on Patentability for International Patent Application No. PCT/US2006/060056, mailed May 8, 2008.
Official Communication for Chinese Patent Application No. 200680049194.8, mailed Mar. 19, 2010.
Official Communication for Chinese Patent Application No. 200680049194.8, mailed Sep. 7, 2010.
Official Communication for Japanese Patent Application No. H10-544219 dated Mar. 19, 2008.
Official Communication for Japanese Patent Application No. 2008-538133 mailed Aug. 29, 2011.
Official Communication for European Patent Application No. 06850051.1. mailed Feb. 24, 2009.
Official Communication for U.S. Appl. No. 11/552,717, mailed Jun. 25, 2009.
Official Communication for U.S. Appl. No. 11/552,717, mailed Feb. 9, 2010.
Official Communication for U.S. Appl. No. 11/258,975, mailed Jun. 4, 2008.
Official Communication for U.S. Appl. No. 11/258,975, mailed Nov. 28, 2008.
Official Communication for U.S. Appl. No. 11/258,975, mailed Feb. 9, 2009.
Official Communication for U.S. Appl. No. 11/258,975, mailed Apr. 10, 2009.
Official Communication for U.S. Appl. No. 12/709,667, mailed Sep. 16, 2010.
Official Communication for U.S. Appl. No. 12/709,667, mailed Apr. 15, 2011.
Official Communication for U.S. Appl. No. 12/709,667 mailed Aug. 3, 2011.

(56) References Cited

OTHER PUBLICATIONS

Official Communication for U.S. Appl. No. 12/709,667 mailed Nov. 9, 2011.

Official Communication for U.S. Appl. No. 12/479,703 mailed Sep. 28, 2011.

Official Communication for U.S. Appl. No. 12/479,703 mailed Feb. 2, 2012.

Official Communication for U.S. Appl. No. 12/709,667 mailed Mar. 1, 2012.

* cited by examiner

200

228

300

500

600

IMAGE ENHANCEMENT BASED ON MULTIPLE FRAMES AND MOTION ESTIMATION

CROSS-REFERENCE TO RELATED APPLICATIONS

This application is a continuation application claiming priority to copending U.S. patent application Ser. No. 12/397,727 filed on Mar. 4, 2009, which patent application claims the benefit of U.S. Provisional Patent Application No. 61/035,424 filed on Mar. 11, 2008, now expired, the benefits of which are hereby claimed at least under 35 U.S.C. §120 and 35 U.S.C. §119(e); all of the foregoing applications are incorporated herein by reference in their entireties.

FIELD

The invention relates generally to image enhancement and more particularly but not exclusively to image enhancement based on multiple frames and motion estimation.

BACKGROUND

Electronic imaging devices image a scene onto a two-dimensional sensor such as a charge-coupled-device (CCD), a complementary metal-on-silicon (CMOS) device or other type of light sensor. These imaging devices generally include a large number of photo-detectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. The data acquired by the image sensor is typically processed to compensate for imperfections of the camera and to generally improve the quality of the image obtainable from the data. Electronic imaging devices generally also include an automatic exposure control capability that typically calculates exposure parameters, such as the exposure time or duration, an aperture size, and gain amount, to result in a luminescence of the image or succession of images. The exposure parameters typically are calculated in advance of the picture being taken, and then used to control the camera during acquisition of the image data.

Unfortunately, it is often difficult for the user to hold a camera by hand during an exposure without imparting some degree of shake or jitter, particularly when the camera is very small and light. As a result, if the exposure time is long, the captured image may have a degree of overall motion blur. Furthermore, even if the camera is steady, a moving object inside the captured scene will be locally blurred if the exposure time is too long. Accordingly, a common solution is to adjust exposure parameters based on the overall motion in the image. However, this can result in at least partially blurred images when multiple sources of motion are present in the scene.

BRIEF DESCRIPTION OF THE DRAWINGS

Non-limiting and non-exhaustive embodiments of the invention are described with reference to the following drawings, in which.

DETAILED DESCRIPTION OF THE EMBODIMENTS

Figure 1A:
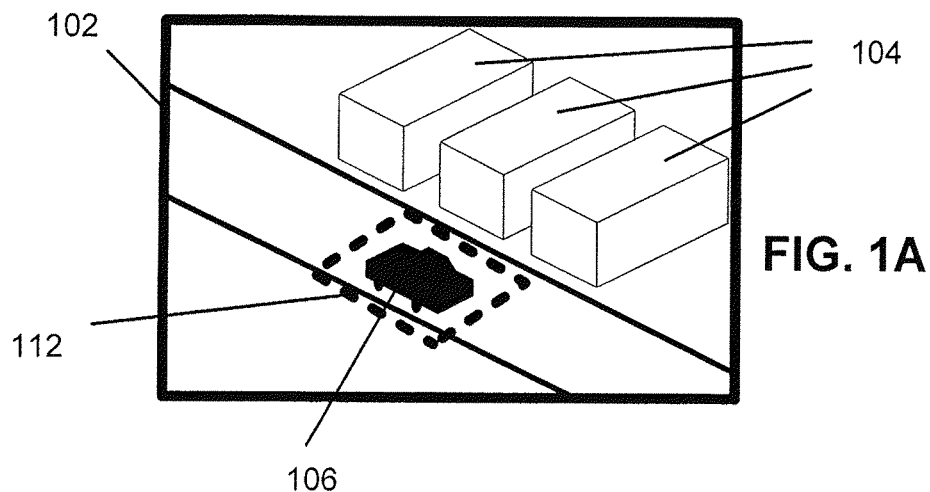
FIGS. 1A-1C conceptually illustrate a method of forming fused images.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The term "electronic imaging device", as used herein, refers to any device or portion thereof adapted for at least generating digital images of a scene using a light-sensitive sensor (e.g., CCD). Such electronic imaging devices can include, but is not limited to, standalone digital still and/or video cameras and digital still and/or video cameras incorporated or connected to devices, systems, and/or communications networks. For example, electronic imaging devices can be implemented within or using computer systems and networks, mobile phones, security systems, and vehicles.

In general, to account for motion during capture of an image for a scene, some types of electronic imaging devices acquire one or more images of the scene in advance (preview images) and set the exposure parameters accordingly. Accordingly, once the image capture process begins, an appropriate set of exposure parameters is immediately available for obtaining the final image. However, even though this exposure parameter set accounts for current motion in a scene, blurring and/or noise may still be present in one or more portions of the image.

In general, the amount of digital camera image noise will vary according to the amplification or gain settings (ISO settings) at the sensor during image capture. ISO settings are typically used to adjust light sensitivity at the image sensors during image capture. In low light conditions or as exposure time is decreased, ISO settings are generally increased to compensate for the lower amount of light the sensors will be exposed to. Unfortunately, as the ISO setting is increased, any noise associated with the signals generated by the image sensors is also increased by these higher gain settings associated with the increased ISO setting. As a result, shorter exposure times generally result in increased noise in the captured image. Blurring is typically the result of a conventional handheld digital cameras being typically configured to provide an exposure parameter set that accounts only for one source of motion in the scene. For example, if the exposure parameter set provides a relatively long exposure time, then moving objects may appear blurred while other objects (e.g., static objects) are relatively clear. As a result, depending on the exposure parameter set, some blurring of moving objects and/or noise may be present in the image.

To overcome these limitation, embodiments of the invention provide for obtaining images of a scene that include multiple sources of motion with reduced blurring and noise. In particular, a composite final image is generated by combining of a first image captured using a first exposure parameter set accounting for global or overall motion in the scene, which for example can be the result of jitter or hand movement of a handheld camera, with one or more additional images captured using one or more additional exposure parameter sets based on moving objects in the scene. This process is conceptually described with respect to FIGS. 1A-1C.

Figure 1B:
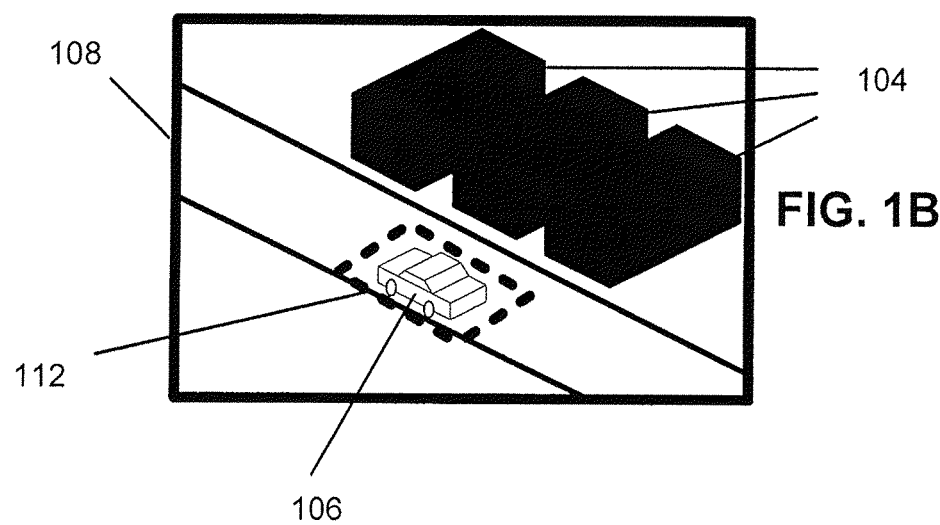

FIG. 1A shows the result of capturing a first image 102 of a scene including buildings 104 and a moving vehicle 106 using a first exposure parameter set. Assuming that the first exposure parameter set compensates for global motion, such an exposure parameter set would specify a relatively large exposure time. As a result, a moving object, such as vehicle 106, can appear blurred (represented by black fill of vehicle 106) as compared to static objects, such as buildings 104. FIG. 1B shows the result of capturing a second image 108 of the same scene including buildings 104 and moving vehicle 106 using a second exposure parameter set. Assuming that the second exposure parameter set compensates for motion of vehicle 106 by specifying a relatively short exposure, the blurring of vehicle 106 in image 108 is reduced relative to image 102. However, the relatively shorter exposure time can result in increased noise throughout the image, as described above. For example, static objects such as buildings 104, which appeared clearly in image 102, can appear to include noise in image 108 (represented by the black fill of buildings 104). Although only buildings 104 in image 108 are shown to include noise in FIG. 1B, this is solely for illustrative purposes. One of ordinary skill in the art will understand that all portions of image 108 will include some amount of noise due to the shorted exposure time.

Figure 1C:
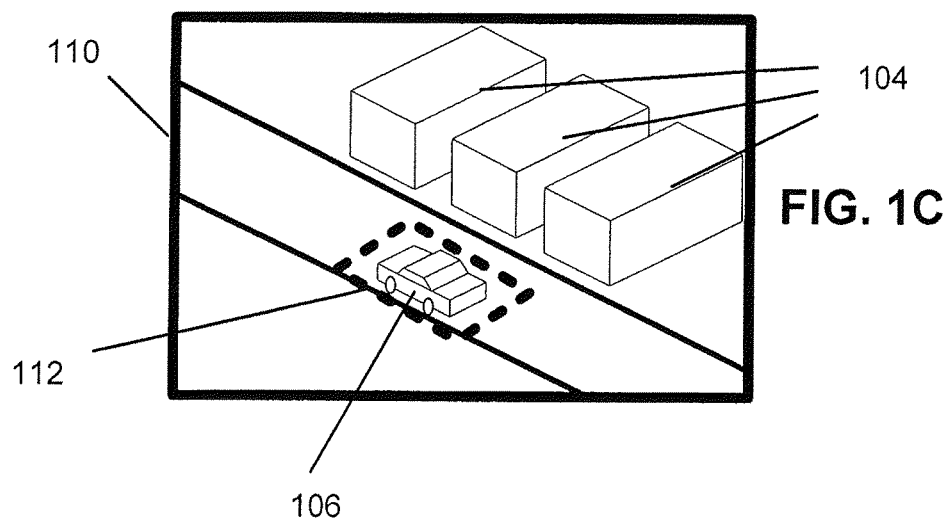

To provide an image with reduced blurring of moving object and reduced image noise, the various embodiments of the invention provide a composite image generated from the fusion of the two or more images captured using different exposure sets, such as the exemplary images in FIGS. 1A and 1B. This is conceptually illustrated in FIG. 1C. FIG. 1C shows composite image 110 resulting from the fusion of first image 102 and second image 108. This is generally accomplished by using first image 102, which compensates for global motion, to provide image portions associated with global motion and using second image 108, which compensate for local motion, to provide image portions associated with local motion. For example, as shown in FIG. 1A, areas outside portion 112 of the first image 102 are associated with global motion are generally unblurred. In FIG. 1B, portion 112 is associated with local motion and areas outside portion 112 can be noisy. Combining the unblurred portions of images 102 and portion 112 from image 108, a generally unblurred image can be provided with reduced noise as compared to image 108. For example, as shown in FIG. 1C, a final composite image 110 is provided in which vehicle 106 is presented with a reduced amount of blurring and building 104 are presented with a reduced amount of noise.

Imaging Device Environment

Figure 2A:
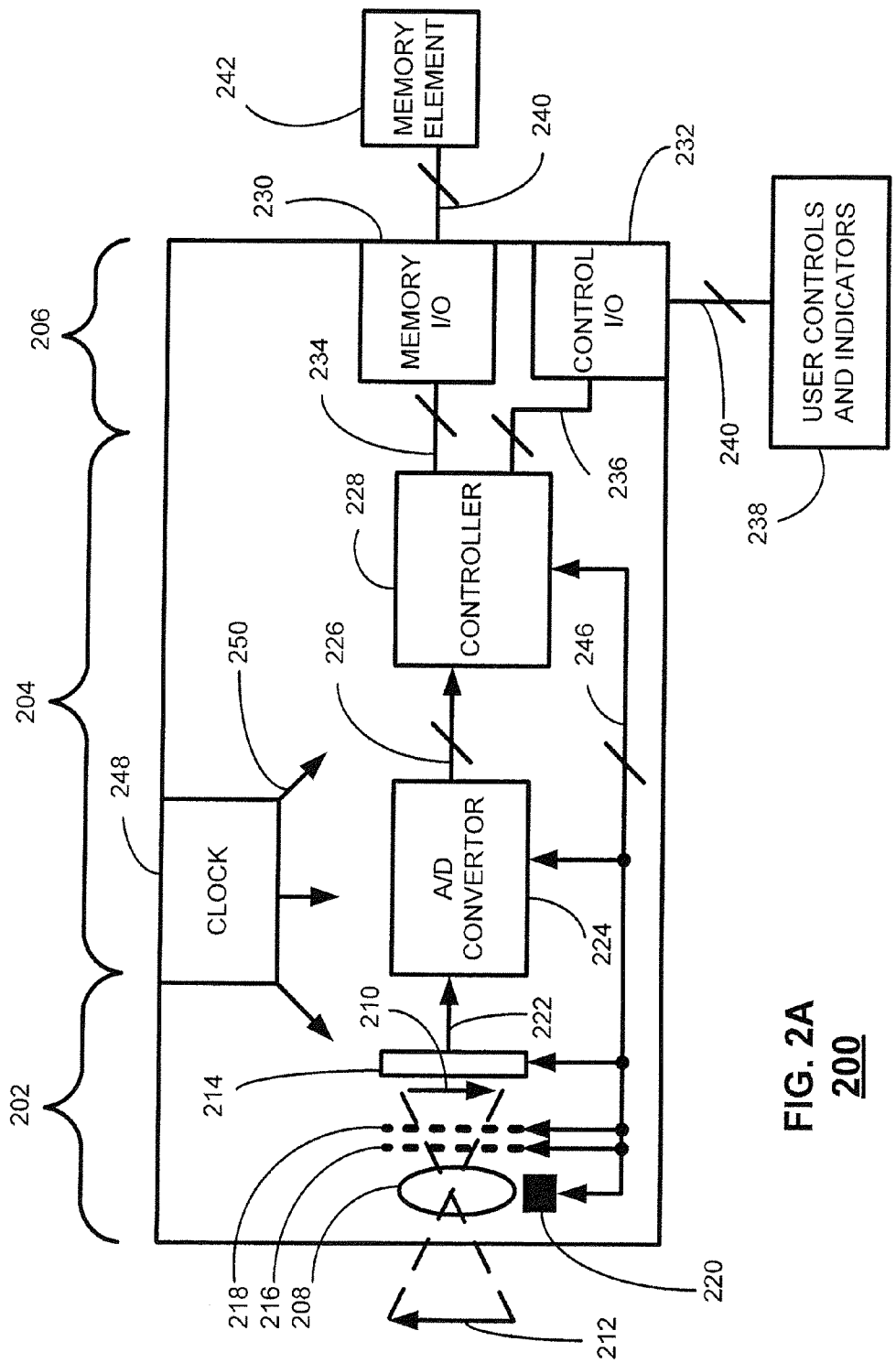
FIG. 2A shows a block diagram of an embodiment of an exemplary electronic imaging device operating environment.

FIG. 2A shows a schematic diagram of an electronic imaging device 200 for obtaining and processing composite still and/or video images according to an embodiment of the invention. Device 200 may include many more components than those shown. The components shown, however, are sufficient to disclose an illustrative embodiment for practicing the invention.

As shown in FIG. 2A, device 200 can include an electronic optical system 202, an image processing system 204, and input/output (I/O) system 206. Optical system 202 can include lens 208, as shown in FIG. 2A. However, in other embodiments of the invention, a set of lenses can be used. In operation, lens 208 forms image 210 of scene 212 on surface of image sensor 214. In general, light travels through aperture 216 and shutter 218 to reach sensor 214. Focus actuator 220 moves one or more elements of optical system 202 to focus image 210 on sensor 214. Electrical output 222 of sensor 214 carries one or more analog signals resulting from scanning individual photo-detectors of surface of sensor 214 onto which image 210 is projected. Sensor 214 typically contains a large number of individual photo-detectors arranged in a two-dimensional array of rows and columns to detect individual pixels of image 210. Signals proportional to intensity of light striking individual photo-detectors are obtained in output 222 to generate a frame of video data from which image 210 may be reconstructed.

Signals 222 generated by sensor 214 are processed using image processing system 204. First, analog signals 222 can be applied to an analog-to-digital (A/D) converter circuit 224 in image processing system 204 that generates digital data signals 226 representing image 210. Digital data signals 226 can then be processed by a processor or controller 228 in image processing system. Various functions of image processing system 204 can be implemented using one or more processing elements. These processing elements can be implemented in hardware, software, or any combination thereof. For example, in one embodiment of the invention, functions of controller 228 and A/D converter circuit 224 can be implemented in one or more integrated circuit chips. Furthermore, in some embodiments of the invention, A/D converter circuit can be incorporated into sensor 214.

Image processing system 204 is communicatively coupled to I/O system 206 to allow storage of captured and/or processed image data and to provide control signals for electronic imaging device 200. For example, as shown in FIG. 2A, controller 228 is communicatively coupled to a memory input/output (I/O) interface 230 and control I/O interface 232 via connections 234 and 236, respectively. Control I/O interface 232 can be coupled to user controls or indicators 238 for exchanging control signals 240 for electronic imaging device 200. Image processing system 204 can also be implemented on one or more computing devices, internal or external to device 200, such as the image processing system described with regard to FIG. 2A.

Memory I/O interface 230 can be coupled to a memory element 242 for exchanging data signals 244. Although a single external memory element 242 is shown in FIG. 2A, the various embodiments of the invention are not limited in this regard. In some embodiments of the invention, controller 228 can be coupled to multiple internal and/or external memory elements. For example, controller 228 can be coupled or can include internal non-volatile memory elements for storing calibration data and the like and/or internal volatile memory elements for temporary data storage. External volatile and/or non-volatile memory elements can also be coupled to processor 228 for storing image data for transferring image data to other electronic imaging devices or image processing systems. Memory element 242 can include, but is not limited to, semiconductor-based memory devices, magnetic storage media devices, or optical storage media devices.

In addition to being coupled to interfaces 230 and 232, controller 228 can also be coupled to control and status lines 246. Lines 246 are, in turn, can be coupled to aperture 216, shutter 218, focus actuator 220, sensor 214, A/D converter 224, and other components of electronic imaging device 200 to provide synchronous operation. Signals in lines 246 from processor 228 drive focus actuator 220, set size of opening of aperture 216, operate shutter 218, and adjust a gain amount for analog signals 222 at A/D converter 224. A clock circuit 248 can be provided within electronic imaging device 200 for providing clock signals 250 to synchronize operation of the various components. Although shown in FIG. 2 as being generated by a separate component in electronic imaging system 200, the clock signal for system 200 can be generated within processor 228 or be provided by an external source.

Figure 2B:
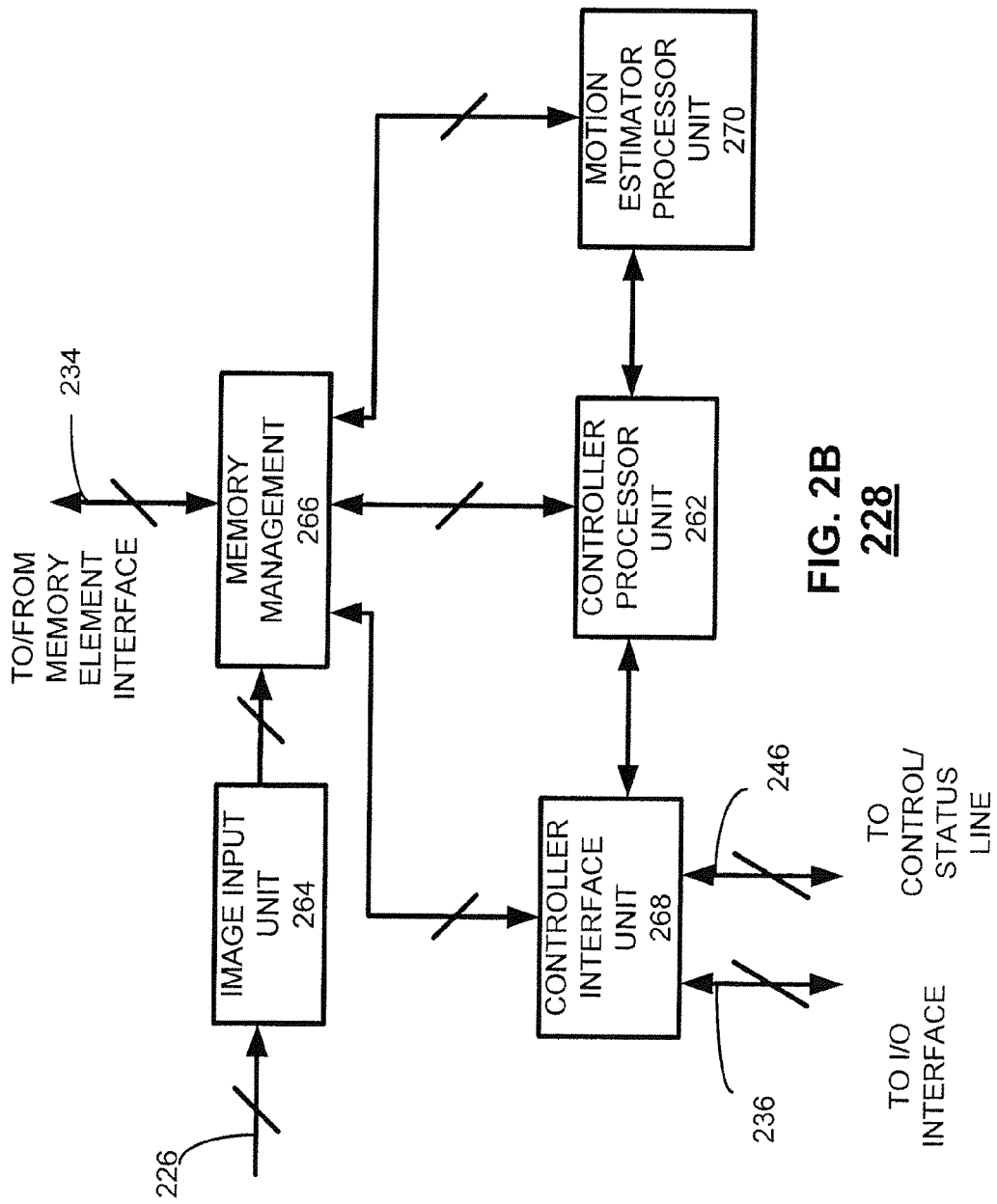
FIG. 2B illustrates a block diagram of some of the functional components of the controller of FIG. 2A.

FIG. 2B illustrates a block diagram for particular components that may be included within controller 228 as previously shown in FIG. 2A. As shown in FIG. 2B, controller 228 can include a controller processor unit 242, which may be general purpose or dedicated to the tasks herein, performing calculations on the image data and controlling operation of the camera. Digital data of successive image frames are received via lines 226 by image input unit 264 of controller 228 and then are communicated to other components of controller 228 by connection through memory management unit 266. Video data of captured image frames can be outputted by memory management unit 266 to a memory element interface and memory element (not shown) through lines 234. Also, the video data can be outputted to user controls and/or indicators (not shown) through controller interface unit 268 and over lines 236 (to the I/O interface 232 of FIG. 2A).

Memory management unit 266 can also be connected to controller processor unit 262. Controller processor unit 262 can also be connected to controller interface unit 268 to enable communication of signals along control status line 246. In some embodiments, controller 228 can also include a dedicated motion estimation processor unit 270 to perform at least some of the calculations to estimate the motion of the image from data acquired from successive image frames. Although controller processor unit 262 can be configured to perform such calculations, a dedicated processor may be provided in one or more embodiments.

Figure 3:
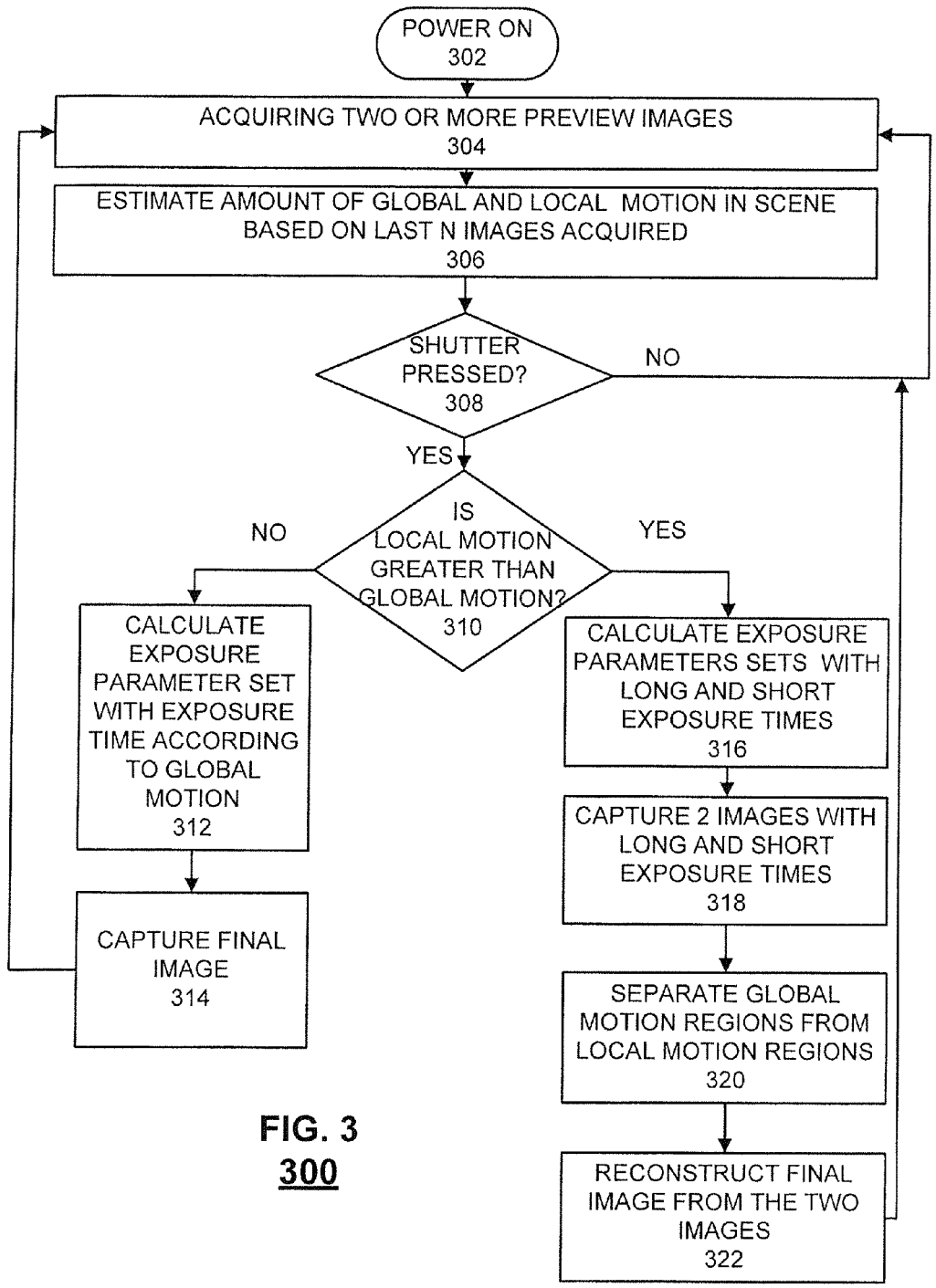
FIG. 3 shows a flowchart of exemplary steps in a method for capturing images.

FIG. 3 is a flow chart of steps in an exemplary method 300 for capturing images using an electronic imaging device. The method can begin with step 302, in which the electronic imaging device is powered on. The method can then continue to step 304. In step 304, two or more preview images of a scene can be captured. Typically such preview images are utilized to detect the amount of motion in a scene and to select the correct exposure parameters, as described in further detail below. For example, these preview images can comprise the preview images normally displayed in a standalone digital camera LCD display. In the various embodiments of the invention, at least two preview images are acquired, such as 2, 5, or 10. As the number of preview images is increased, the accuracy of the estimation of the amount of motion in one or more different portions of the scene can be increased. This acquisition can be performed at any frame rate, such as 30, 40, or 50 frames per second or more. The estimation of these amounts of motion will be described below in greater detail with respect to FIG. 4.

In some embodiments of the invention, the preview images can have the same resolution as the final composite image. In other embodiments of the invention, the preview images can have a reduced resolution. In the case of lower resolution preview images, subsequent motion estimation computation intensity and motion estimation accuracy can also be reduced as the number of pixels analyzed is also reduced.

Following step 304, the image data for the N number of preview images is used to detect and estimate amounts of motion in a scene in steps 306. In the various embodiments of the invention, any change in motion of the scene image relative to the photo sensor is detected and quantified by looking at changes in successive preview images. As a result, vectors and magnitudes of motion, velocity and acceleration can be calculated from data of the N preview images. In step 306, the global motion in the N images (overall motion) can be detected and the magnitude of motion associated with global or overall motion can be estimated. Additionally, local motion in the N preview images can also be is detected. The process of determining the magnitude of local and global motion in different areas of a scene is conceptually described with respect to FIG. 4.

Figure 4:
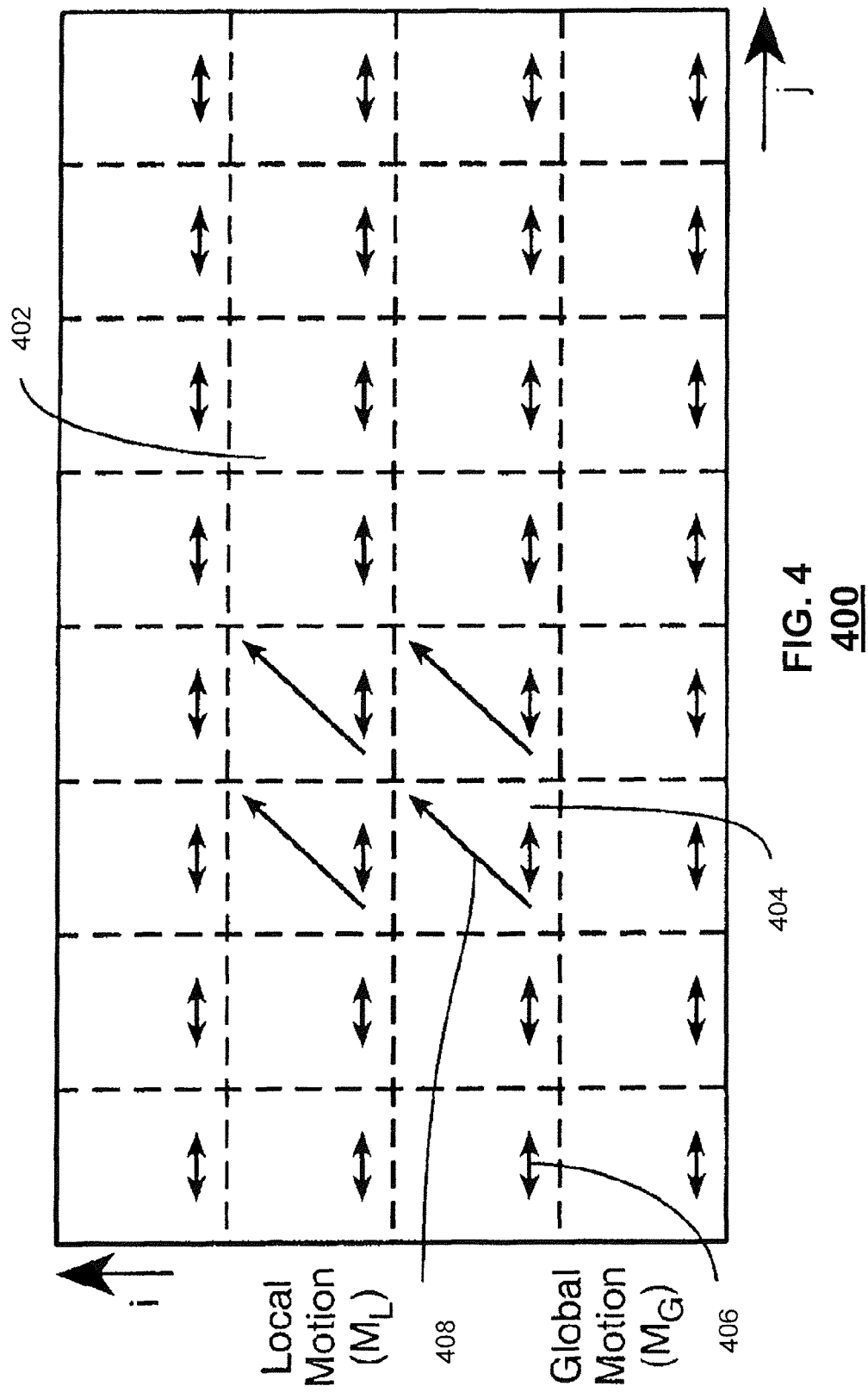
FIG. 4 shows an exemplary image frame with its pixels grouped into blocks of multiple pixels used for identifying areas of local motion and magnitudes of global and local.

FIG. 4 conceptually shows an exemplary image frame 400 with its pixels grouped into blocks of multiple pixels each, such as blocks 402 and 404, used for determining magnitudes of global and local motion and areas of local motion in accordance with an embodiment of the invention. In FIG. 4, motion of different portions of the scene being captured relative to the image frame 400 are indicated by arrows 406 and 408. In the exemplary image, global motion in the image frame 400 is represented by a global motion vector $M_G$ indicated by arrows 406 in each of the blocks of pixels. The magnitude and direction of $M_G$ can be calculated from image data of N preview images by detecting and quantifying overall movement between the N preview images. Such calculation can be implemented via a software and/or hardware means. Although vector $M_G$ indicates a lateral motion for image frame 400 in FIG. 4, embodiments of the invention are not limited in this regard. Rather, global motion can occur in any direction and in any pattern.

Also as shown in FIG. 4, the image frame 400 includes blocks 404 having additional local motion vectors $M_L$ independent of the global motion. These vectors represent local motion in the scene being imaged. Such motion can be from the movement of a person, a vehicle, and/or other objects moving in the scene. Any algorithms for the calculation of motion within a scene based on a sequence of images can be used. For example, motion vectors can be calculated in a manner that is similar to the calculation of motion vectors used by known video compression algorithms, examples being those of the Moving Picture Experts Group, such as MPEG-4. The vectors $M_G$ and $M_L$ can therefore be used to estimate both the magnitudes of global and local motion in the scene.

Referring back to FIG. 3, method 300 can detect whether an image capture command has been received at step 308 subsequent to or in combination with step 306. For example, in the case of a hand held digital camera, the method 300 can determine in step 308 if the shutter button has been pressed. If no capture command has been received at step 308, the method can repeat steps 304 and 306 until the shutter button is pressed.

Once the shutter button has been pressed, the difference between the magnitudes of global and local motion estimated at step 308 can be compared at step 310. If at step 310 the magnitude of the local motion in at least one portion of the scene is not greater than the magnitude of global motion, then no blurring would typically occur if exposure parameters, including exposure time, are configured based on global motion. At step 312, an exposure parameter set, including exposure time, is calculated based on the amount of global motion in the preview images.

In general, an exposure parameter set is calculated to provide an average luminescence across the image within a predefined range. In the various embodiments of the invention, any algorithm for calculation of the exposure parameter set can be used. As described above, the calculated exposure parameter set can provide an exposure time or duration and other exposure parameters, such as size of the aperture opening and gain. Generally, an exposure parameter set specifies a large value for slow motion, such as global motion, and a smaller value for faster motion, such as local motion.

The exposure parameter set obtained at step 312 can then be used at step 314 to capture a final image. The image data for the final image can then be stored, as described above with respect to FIG. 2. The method 300 can then return to step 304 to prepare for capturing a next image.

If the magnitude of the local motion in at least one part of the scene at step 310 is greater than the magnitude of the global motion, a fusion or reconstruction process can be used to obtain a composite image, as described above with respect to FIG. 1. First, at step 316, exposure parameter sets can be calculated. In particular, first and second exposure parameter sets with long and short exposure times, respectively, can be calculated. That is, a first exposure parameter set is calculated for capturing a first image based on the amount of global motion, similar to step 312. Subsequently or in combination, a second exposure parameter set is calculated for capturing a second image based on the amount of local motion.

Although only two exposure parameter sets are calculated in method 300 for capturing two images, in other embodiments of the invention, any number of exposure parameter sets can be computed at step 316. For example, based on the number of portions of the scene having a magnitude of local motion greater than the magnitude of global motion in the scene. In such embodiments, a different exposure parameter set can be computed for each portion of the scene having local motion. In other embodiments of the invention, exposure parameter sets can be calculated if at least one portion of the scene has a local motion within an associated range. In still other embodiments of the invention, to reduce the number of capture images to be combined into a composite image, the second exposure parameter set can be based on an average, median, or maximum amount of motion in the scene.

Once the first and second exposure parameter sets have been calculated at step 316, respectively, two images can be captured at step 318 using the long and short exposure times provided by the first and second exposure parameter sets, respectively. Once the images are captured at step 318, the images are processed at step 320 to separate regions of global motion from regions of local motion in the images.

After the separation process is completed at step 320, the final image can be reconstructed at step 322. In particular, as described above with respect to FIG. 1C, areas of the first image associated with global motion can be combined with areas of the second image associated with local motion. The resulting image therefore combines image information from the first and second images. This can also be referred to as a fusion process. Details of an exemplary fusion process will be described below with respect to FIG. 6. The image data for the composite image can then be stored as the final image. The method 300 can then return to previous processing at step 304. For example, the method 300 can repeat starting with step 304 in preparation for capturing a next image.

Figure 5:
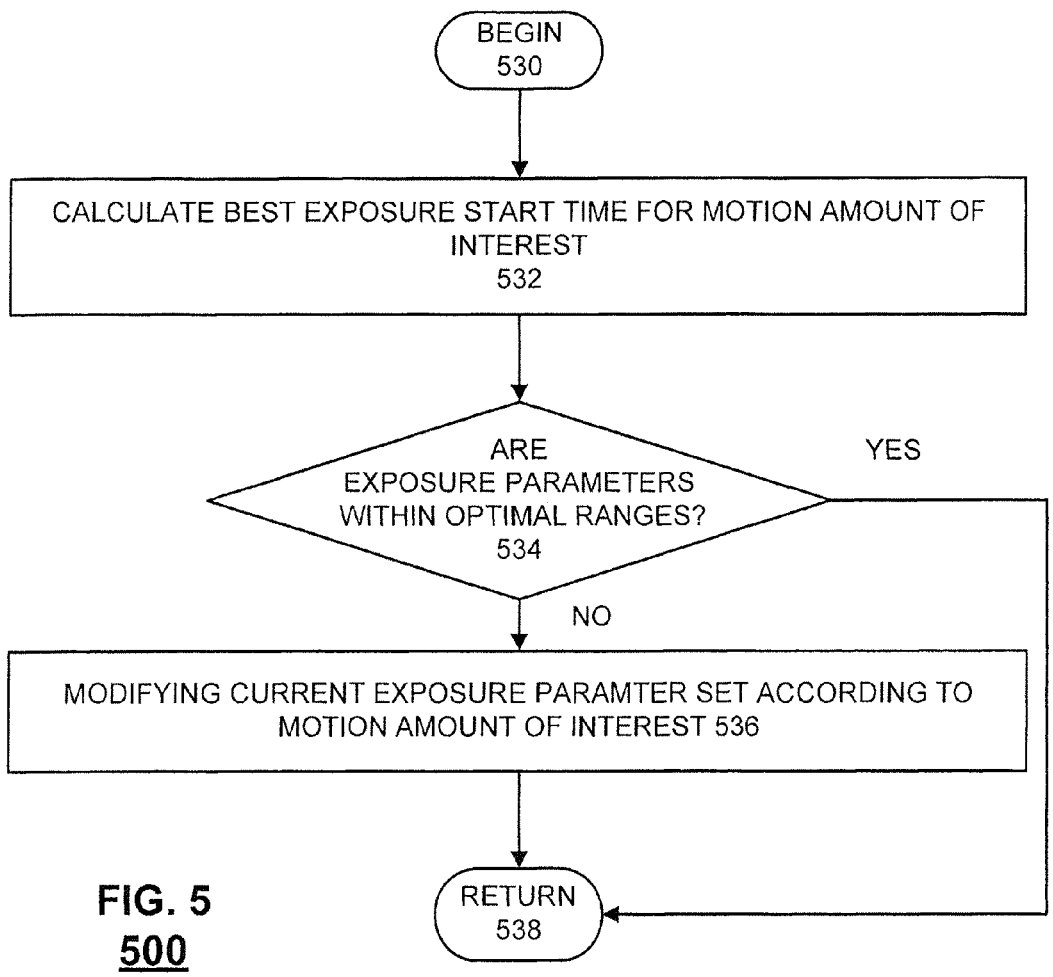
FIG. 5 illustrates a flow chart for obtaining a exposure parameter set based on a motion of interest.

In general, the exposure parameter sets for global and local motion are obtained by modifying a current or default exposure parameter set in an electronic imaging device. FIG. 5 is a flow chart showing steps in an exemplary method 500 for calculating an exposure parameter set from motion quantities according to an embodiment of the invention. The method 500 begins at step 530 and continues on to step 532. At step 532, the instant in time to take the picture is estimated from the magnitude of the motion of interest (global or local motion) previously calculated. This estimate is made by extrapolating the magnitude of the motion of interest calculated from the preview images, and then identifying the point of zero or minimal motion within a set period. It is at that instant that the image can be scheduled to be captured. If, however, a zero or minimal motion point cannot be detected with high precision, due to the complexity of the motion, or if the user has chosen to turn off the delayed capturing option, or if the motion quantities show that there is little or no motion of the image, then the time for capturing the image is not postponed and capture of the image is executed right away.

Once the best exposure start time is calculated in step 532, the method 500 determines at step 534 whether the current exposure parameter set needs to be altered based on the exposure start time. For example, if the exposure duration in the current exposure parameter is set to be below a certain threshold, then no further decrease of the exposure time is provided. Similarly, if the aperture and gain in the current exposure set are smaller than corresponding thresholds, then it is not necessary to consider whether motion in the image is small enough to allow the exposure duration to be increased in order to lower them to improve depth of field or reduce noise. In such a case, the processing proceeds to step 538 and returns to previous processing. That is, the motion quantities are not used or referenced and the picture can be taken right away.

However, if the parameters in the current exposure set are not within optimum ranges at step 534, they are adjusted at step 536 in order to optimize them for the magnitude of the motion of interest. For example, as exposure time is decreased over that specified in the current exposure set (in response to an increased amount of motion); at least some amount of gain increase (i.e., an increased ISO setting) is generally needed to compensate for the loss in luminescence due to the reduced exposure time. As motion continues to increase, an increase in aperture size can also be needed to compensate for the loss in luminescence. In contrast, as exposure time is increased over that specified in the current exposure set (in response to a decreased amount of motion); at least some amount of aperture size reduction is generally needed to compensate for the increase in luminescence due to the increased exposure time. As motion continues to decrease, a decrease in gain can also be needed to compensate for the increase in luminescence. Once the modified exposure parameter set is obtained in step 536, the method 500 can end at step 538 and return to previous processing.

In the examples of ISO setting adjustment given above, the gain level of the analog signal is adjusted before digitizing the signal and this adjusted level is then used during capture of the image. In addition to this, or in place of it, the gain of an image can be adjusted in the digital domain after data of the image have been captured and digitized. For example, the digital gain adjustment can be performed after image capture, as part of image processing or enhancement stage, but before writing it to a memory element. Although digital gain increase usually results in a noisier image than analog gain increase, it may be convenient to control the digital gain as well. The amount of digital gain that is required may be determined during the process that adjusts the exposure parameters in advance of image capture, as part of calculating the exposure time, aperture and perhaps analog gain, but then applied to the digital data of the image after it has already been captured. Alternatively, or in addition, the gain level of the image may be determined and adjusted as part of the post-processing or enhancement of the captured image data and applied thereafter in that stage.

Figure 6:
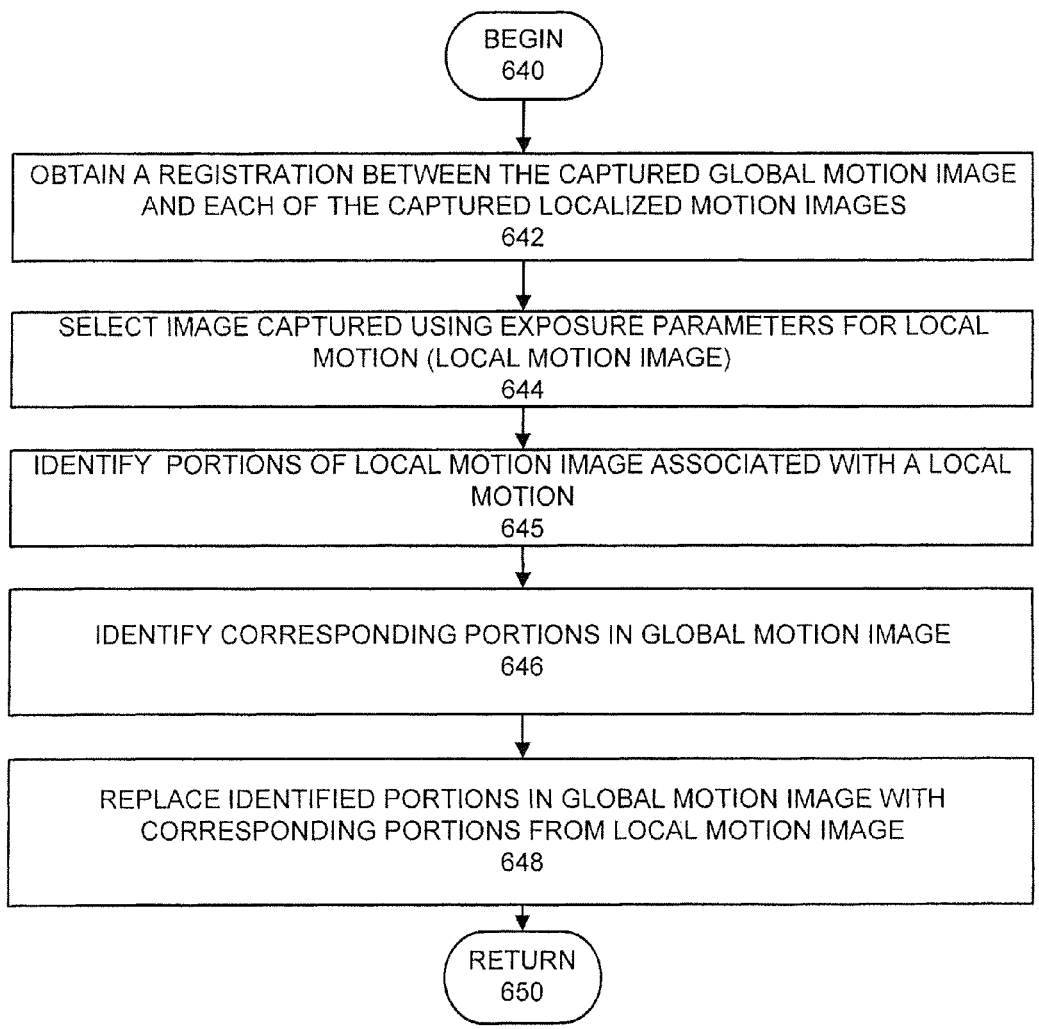
FIG. 6 shows a flowchart of exemplary steps in a method for fusing images in accordance with the invention.

As previously described, once images have been captured using exposure parameter sets for global and local motion, the images can be fused. One method of fusing image is selecting portions of first and second images and combining them into a third image. For example, areas of global motion from a first image can be selected and areas of local motion from a second image can be selected. Another method of reconstructing the final image is to fuse a portion of an image captured using parameters based on local motion (local motion image) into an image captured using exposure parameters based on global motion (global motion). FIG. 6 illustrates such a method. In such a method, the global motion image is used as the base image for several reasons. First, since the global motion image is captured using an exposure parameter set associated with the lowest amount of motion in the image, the depth of field is the greatest. Second, since the gain is typically the lowest for images having lower amounts of motion, such as the global motion image, the amount of noise introduced into the composite image is limited. Accordingly, if a majority of the scene is associated with only global motion, the quality of the composite image is only partially affected by the increased noise and reduced depth of focus in the portions of the local motion image therein.

FIG. 6 is a flowchart showing steps in an exemplary method 600 for fusing captured images according to an embodiment of the invention. The method 600 can begin at step 640 and continue on to step 642. At step 642, a registration or alignment relationship between the captured images can be obtained. That is, a function is obtained that describes the location of pixels in a first captured image relative to a second captured image. Subsequently or in combination with step 642, the local motion image can be selected at step 644.

Following selection of a local motion image at step 644, one or more portions of the selected local motion image associated with local motion can be identified at step 645. That is, with reference to FIG. 4, areas in the local motion image can be identified that correspond to the blocks of local motion (blocks 404). Once the portions of the local motion image associated with the local motion are identified in step 645, the corresponding portion of global motion image can be identified at step 646.

After the corresponding portions of the global motion and local motion images are identified at steps 645 and 646, the identified portions of the global motion image are replaced with the corresponding portions of the local motion image in step 648. Once the replacement process in step 648 is completed, the method 600 can return to previous processing at step 650.

The replacement process at step 648 can vary depending on the registration between the images. For example, in some cases, a straight pixel by pixel replacement method can be used. That is, the values of pixels in the global motion image are directly replaced with values from corresponding pixels in the local motion image. Such a method can work well when the electronic imaging device is attached to a fixed position (e.g., tripod). However, if some amount of global motion is present, a straight pixel by pixel replacement can result in visible discontinuities in the composite image, particularly along the edge of the inserted portion in the global motion image. This can be a result of the position of the pixels not overlapping significantly. That is, the position of a pixel in the local motion image in the global motion image lies between the positions of two or more adjacent pixels in the global motion image. As a result, the values for pixels being replaced in the global motion image can require some amount of correction. For example, the values for the pixels can be adjusted (i.e., by averaging or smoothing of pixel values) to provide a continuous transition at the edges of the inserted portion. Another option is to calculate some transformation between the two images according to registration results and then warp the local motion image with the resulted transformation. A projective transformation is just one of many types of such a transformation.

Additionally, a discontinuity can be visible even if the pixels in the different images are perfectly aligned. Since the images to be combined are captured using different exposure parameter sets, the brightness and contrast in the inserted portion can be significantly greater than that of the global motion image. Therefore, in some embodiments of the invention, a correction can be applied to the pixels being inserted on the global motion image to reduce this difference. For example, the values of the pixels in the different images can be normalized based on the exposure time difference. In another example, the values of the pixels in the inserted portion can be normalized based on pixel values of the surrounding global motion image.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claim.

What is claimed is:

1. An imaging device, comprising:
an optical system used to receive images; and
a processing element communicatively coupled to the optical system and that is programmed to perform actions, including:
receiving a plurality of preview images from the optical system;
estimating a global motion and a local motion based on at least a portion of the plurality of preview images; and
when the estimated local motion is less than or equal to the estimated global motion, configuring the optical system to provide a final image based at least on an exposure time based on the estimated global motion; and otherwise:
configuring the optical system to provide a first image based on at least a first exposure parameter set and a plurality of other images based at least on one or more other exposure parameter sets,
separating a global motion region from a local motion region in the first image,
separating a plurality of local motion regions from global motion regions in the plurality of other images, and
generating a final composite image from a fusion of the separated global motion region from the first image with the separated plurality of local motion regions in the plurality of other images.

2. The imaging device of claim 1, wherein at least one exposure parameter includes an exposure time, and wherein at least one exposure time within the one or more other exposure parameter sets is less than an exposure time in the first exposure parameter set.

3. The imaging device of claim 1, wherein configuring the optical system to provide the first image comprises computing a first exposure time based on the estimated global motion, the first exposure time being included within the first exposure parameter set.

4. The imaging device of claim 1, wherein at least one exposure parameter within the one or more other exposure parameter sets is computed based on the estimated local motion.

5. The imaging device of claim 1, wherein generating a final composite image further comprises replacing image information in the first image for at least one area of location motion with image information in one or more of the plurality of other images for at least one are of local motion.

6. The imaging device of claim 1, wherein at least one exposure parameter in the first and one or more other exposure parameter sets include an exposure time, a size of an aperture opening, or a gain.

7. A controller device, comprising:
a memory management unit configured to receive and manage images; and
a processor unit that is programmed to receive images and perform actions, including:
receiving a plurality of preview images from the memory management unit;
estimating a global motion and a local motion based on at least a portion of the plurality of preview images; and
when the estimated local motion is less than or equal to the estimated global motion, configuring an optical system to provide a final image based at least on an exposure time based on the estimated global motion; and otherwise:
configuring the optical system to provide a first image based on at least a first exposure parameter set and a plurality of other images based at least on one or more other exposure parameter sets,
separating a global motion region from a local motion region in the first image,
separating a plurality of local motion regions from global motion regions in the plurality of other images, and
generating a final composite image from a fusion of the separated global motion region from the first image with the separated plurality of local motion regions in the plurality of other images.

8. The controller device of claim 7, wherein at least one exposure parameter within the one or more other exposure parameter sets is computed based on at least one of an average, a median, or a maximum amount of motion detected within a scene.

9. The controller device of claim 7, wherein at least one exposure parameter within the one or more other exposure parameter sets is computed based on a determined of a number of portions of a scene having a magnitude of estimated local motion that is greater than a magnitude of estimated global motion in the scene.

10. The controller device of claim 7, wherein generating a final composite image further comprises replacing image information in the first image for at least one area of location motion with image information in one or more of the plurality of other images for at least one are of local motion.

11. The controller device of claim 7, wherein at least one exposure parameter in first and one or more other exposure parameter sets include an exposure time, a size of an aperture opening, or a gain.

12. The controller device of claim 7, wherein a time to capture the first image is determined based on estimating a magnitude of motion by extrapolating the magnitude of motion from the plurality of preview images, and identifying a point of minimal motion within a set period.

13. The controller device of claim 7, wherein at least one exposure parameter includes an exposure time, and wherein at least one exposure time with the one or more other exposure parameter sets is less than an exposure time in the first exposure parameter set.

14. The controller device of claim 7, wherein configuring the optical system to provide the first image comprises computing a first exposure time based on the estimated global motion, the first exposure time being included within the first exposure parameter set.

15. A non-transitory processor-readable storage device, having processor executing instructions that perform actions, comprising:
receiving a plurality of preview images from an optical system;
estimating a global motion and a local motion based on at least a portion of the plurality of preview images; and
when the estimated local motion is less than or equal to the estimated global motion, configuring the optical system to provide a final image based at least on an exposure time based on the estimated global motion; and otherwise:

configuring the optical system to provide a first image based on at least a first exposure parameter set and a plurality of other images based at least on one or more other exposure parameter sets, separating a global motion region from a local motion region in the first image, separating a plurality of local motion regions from global motion regions in the plurality of other images, and generating a final image from a composite of just the separated global motion region from the first image with the separated plurality of local motion regions in the plurality of other images.

16. The storage device of claim 15, wherein at least one exposure parameter within the one or more other exposure parameter sets is computed based on at least one of an average, a median, or a maximum amount of motion detected within a scene.

17. The storage device of claim 15, wherein at least one exposure parameter within the one or more other exposure parameter sets is computed based on a determined of a number of portions of a scene having a magnitude of estimated local motion that is greater than a magnitude of estimated global motion in the scene.

18. The storage device of claim 15, wherein generating a final image further comprises replacing image information in the first image for at least one area of location motion with image information in one or more of the plurality of other images for at least one are of local motion.

19. The storage device of claim 15, wherein at least one exposure parameter in first and one or more other exposure parameter sets include an exposure time, a size of an aperture opening, or a gain.

20. The storage device of claim 15, wherein a time to capture the first image is determined based on estimating a magnitude of motion by extrapolating the magnitude of motion from the plurality of preview images, and identifying a point of minimal motion within a set period.

* * * * *